(12) United States Patent
Honda et al.

(10) Patent No.: US 8,534,773 B2
(45) Date of Patent: Sep. 17, 2013

(54) HYDRAULIC BOOSTER AND HYDRAULIC BRAKE SYSTEM USING THE SAME

(75) Inventors: Tetsuya Honda, Chiryu (JP); Hideki Yamamoto, Handa (JP); Shigemitsu Nohira, Kariya (JP); Yoshihiro Miyata, Anjyo (JP)

(73) Assignee: Advics Co., Ltd., Kariya, Aichi (JP)

( * ) Notice: Subject to any disclaimer, the term of this patent is extended or adjusted under 35 U.S.C. 154(b) by 0 days.

(21) Appl. No.: 13/824,837

(22) PCT Filed: Apr. 5, 2012

(86) PCT No.: PCT/JP2012/059315
§ 371 (c)(1),
(2), (4) Date: Mar. 18, 2013

(87) PCT Pub. No.: WO2012/137859
PCT Pub. Date: Oct. 11, 2012

(65) Prior Publication Data
US 2013/0175851 A1    Jul. 11, 2013

(30) Foreign Application Priority Data

Apr. 5, 2011  (JP) ................................ 2011-083490
Jul. 25, 2011  (JP) ................................ 2011-162087

(51) Int. Cl.
*B60T 8/44*  (2006.01)
(52) U.S. Cl.
USPC .................................................... 303/114.1
(58) Field of Classification Search
USPC ...... 188/358, 360, 362; 303/114.1; 60/547.1, 60/550, 552
See application file for complete search history.

(56) References Cited

U.S. PATENT DOCUMENTS 4,548,037 A    10/1985  Farr
6,183,049 B1 *  2/2001  Oka et al. ................... 303/114.1
(Continued)

FOREIGN PATENT DOCUMENTS

JP    2003-019952 A    1/2003
JP    2003-137083 A    5/2003
(Continued)

OTHER PUBLICATIONS

International Search Report (PCT/ISA/210) issued on May 22, 3012, by the Japanese Patent Office as the International Searching Authority for International Application No. PCT/JP2012/059315.

(Continued)

*Primary Examiner* — Christopher Schwartz
(74) *Attorney, Agent, or Firm* — Buchanan Ingersoll & Rooney PC

(57) ABSTRACT

A hydraulic brake system is proposed which includes a hydraulic booster for boosting brake operation, and a circulation type pressure control unit. The hydraulic brake system further includes a hydraulic booster including an auxiliary hydraulic pressure source, a pressure regulator for adjusting the hydraulic pressure supplied therefrom to a value corresponding to an operating amount of a brake operating member and introducing the thus adjusted hydraulic pressure into a boost chamber, and a boost piston for actuating a master piston with a force boosted by an assisting force generated by the hydraulic pressure introduced into the boost chamber. The hydraulic booster further includes a hydraulic line bypassing the pressure regulator and extending from the boost chamber to the auxiliary hydraulic pressure, and a check valve provided in the hydraulic line and configured to allow only a discharge of hydraulic pressure from the boost chamber into the auxiliary hydraulic pressure source.

8 Claims, 12 Drawing Sheets

(56) References Cited

U.S. PATENT DOCUMENTS

| | | |
|---|---|---|
| 6,276,136 B1 * | 8/2001 | Oishi et al. .................. 60/547.1 |
| 6,705,682 B2 * | 3/2004 | Kusano et al. ............. 303/114.1 |
| 2003/0085613 A1 | 5/2003 | Nakano |
| 2006/0158026 A1 * | 7/2006 | Aoki et al. ................. 303/114.1 |
| 2007/0069577 A1 | 3/2007 | Nakaura et al. |
| 2008/0236971 A1 * | 10/2008 | Suzuki et al. ................. 188/358 |
| 2008/0258545 A1 * | 10/2008 | Drumm ....................... 303/114.1 |
| 2010/0244551 A1 * | 9/2010 | Hirano et al. .............. 303/114.1 |
| 2012/0074769 A1 | 3/2012 | Sakata |

FOREIGN PATENT DOCUMENTS

| | | |
|---|---|---|
| JP | 2007-091051 A | 4/2007 |
| JP | 2012-066720 A | 4/2012 |

OTHER PUBLICATIONS

Written Opinion (PCT/ISA/237) issued on May 22, 2012, by the Japanese Patent Office as the International Searching Authority for International Application No. PCT/JP2012/059315.

\* cited by examiner (a)

(b)

HYDRAULIC BOOSTER AND HYDRAULIC BRAKE SYSTEM USING THE SAME

TECHNICAL FIELD

This invention relates to a hydraulic booster which generates an assisting force corresponding to an operating amount of a brake operating member based on hydraulic pressure supplied from an auxiliary hydraulic pressure source, and applies the assisted braking force to a master cylinder, and a hydraulic brake system including such a hydraulic booster.

BACKGROUND ART

The below-identified Patent document 1 discloses a hydraulic booster including an auxiliary hydraulic pressure source having a power pump and a pressure accumulator, and a pressure regulator including a spool valve and configured to adjust the hydraulic pressure supplied from the auxiliary hydraulic pressure source to a value corresponding to the operating amount of a brake operating member, and to introduce the thus adjusted hydraulic pressure into a boost chamber as an assisting force, in which an assisted force (sum of the brake operating force applied by a driver of the vehicle and the above assisting force) is applied to the piston of the master cylinder.

Hydraulic brake systems are now commercially available which includes a circulation type pressure control unit including an electronic control unit which performs anti-lock brake control (ABS) and/or electronic (vehicle) stability control (ESC).

The electronic control unit of the circulation type, pressure control unit receives information from various known sensors for detecting e.g. wheel speeds, the stroke of the brake operating member, brake hydraulic pressure, and the behavior of the vehicle. When the electronic control unit determines, based on the information received, that it is necessary to reduce pressure of at least one wheel cylinder, the electronic control unit closes a pressure increasing solenoid valve in the hydraulic line extending from the master cylinder to the wheel cylinder, and opens a pressure reducing solenoid valve in a hydraulic line extending from the wheel cylinder to a low-pressure fluid reservoir, thereby reducing the wheel cylinder pressure.

When the electronic control unit determines, thereafter, that it is necessary to reincrease the wheel cylinder pressure, the electronic control unit opens the pressure increasing solenoid valve, closes the pressure reducing solenoid valve, and activates a circulating power pump to draw brake fluid in the low-pressure fluid reservoir and return the thus drawn brake fluid into the hydraulic line extending from the master cylinder to the wheel cylinder.

Some of such hydraulic brake systems having the above-described circulation type pressure control unit include a shut-off valve provided in the hydraulic line extending from the master cylinder to each wheel cylinder at its point upstream of the point (return point) at which the brake fluid drawn by the circulating pump is returned into the hydraulic line, i.e. the point between the master cylinder and the return point, and others do not have such a shut-off valve. The shut-off valve is closed during e.g. ABS control.

In the arrangement without the shut-off valve, brake fluid drawn by the circulating pump flows back toward the master cylinder (this phenomenon is often called, and hereinafter referred to as "pump back flow").

PRIOR ART DOCUMENT(S)

Patent Document(s)

Patent document 1: U.S. Pat. No. 4,548,037

SUMMARY OF THE INVENTION

Object of the Invention

Hydraulic brake systems are known having the above-described circulation type pressure control unit and a booster for boosting the braking force applied by the driver. The booster is typically a vacuum booster which produces an assisting force utilizing a negative pressure generated in the engine. But it is impossible use a negative pressure generated in an engine to produce such an assisting force if the vehicle is a hybrid electric vehicle (HEV), an electric vehicle (EV) or a Valvematic vehicle, in which the valve lifts of the intake valves are continuously variable such that the intake valves serve as throttle valves. Thus, it is now being considered to provide a hydraulic brake system of this type with a hydraulic booster of the type in which hydraulic pressure (boost pressure) introduced into a boost chamber is applied to a boost piston to produce an assisting force.

But if such a hydraulic booster is used instead of a vacuum booster, the pump back flow could cause an abnormal rise in the master cylinder pressure and the boost pressure.

In particular, the pump back flow, which is a back flow from the pressure control unit toward the master cylinder, pushes back the piston of the master cylinder (master cylinder piston), thereby also pushing back the boost piston (or a "power piston" of a vacuum booster).

If the booster is a vacuum booster, in which the pressure difference between the negative pressure chamber and the atmospheric pressure chamber is applied to the power piston to produce the assisting force, even when the power piston is pushed back, since the air sealed in the atmospheric pressure chamber is compressed due to the displacement of the piston, the pressure in the atmospheric pressure chamber will not rise excessively.

If the booster is a hydraulic booster, pressure is applied to the brake fluid sealed in the boost piston, which is oil, an incompressible liquid, when the boost piston is pushed back by the pump back flow. Thus, the pressure in the boost chamber tends to rise excessively until the discharge port between the boost chamber and the atmospheric pressure reservoir opens and the boost chamber is brought into communication with the atmospheric pressure reservoir.

If the master cylinder pressure and the boost pressure rise to an abnormal level, fluid seals of the master cylinder and the hydraulic booster may be damaged, which results in reduced durability of the fluid seals. If the master cylinder pressure and the boost cylinder pressure rise to an extremely high level, this could result in breakage of the master cylinder and/or the hydraulic booster.

An object of the present invention is to prevent any abnormal rise in master cylinder pressure and boost pressure due to pump back flow in a brake system including a hydraulic booster and a circulation type pressure control unit (such as an ABS unit or an ESC unit), thereby avoiding reduced durability or breakage of the master cylinder and the hydraulic booster.

Means to Achieve the Object

In order to achieve the above object, the present invention provides a hydraulic booster of any of the below-described three types (1) to (3) and a hydraulic brake system of the below-described type (4) or (5).

(1) A hydraulic booster for use in a hydraulic brake system, including an auxiliary hydraulic pressure source including a power pump and a pressure accumulator, a pressure regulator including a spool valve and configured to adjust hydraulic pressure supplied from the auxiliary hydraulic pressure source to a value corresponding to an operating amount of a brake operating member by displacement of the spool valve and to introduce the thus adjusted hydraulic pressure into a boost chamber, and a boost piston for producing an assisting force under the hydraulic pressure introduced into the boost chamber, thereby actuating a master piston of a master cylinder with an assisted force, wherein the hydraulic booster further comprises at least one hydraulic line which bypasses the pressure regulator and through which one of the boost chamber and a pressure chamber of the master cylinder is connected to one of the auxiliary hydraulic pressure source and an atmospheric pressure reservoir, and at least one check valve provided in the hydraulic line and configured to allow only a discharge of hydraulic pressure from the one of the boost chamber and the pressure chamber of the master cylinder to the one of the auxiliary hydraulic pressure source and the atmospheric pressure reservoir.

(2) A hydraulic booster including all of the features of the above type (1) hydraulic booster and further including a sticking preventive mechanism configured to move a valve body of the check valve to an open position while brakes are not being applied by a driver, and to return the valve body to a closed position when the brakes are applied by the driver, utilizing e.g. relative movement between two members in the hydraulic booster when the brakes are operated by the driver, thereby preventing the check valve from getting stuck.

For example, the valve body of the check valve is supported by one of the housing of the booster and a movable member movable in the housing when driving force is applied thereto, such as the boost piston or an input piston through which the brake operating force is adapted to be transmitted to the boost piston, while the valve seat of the check valve is formed on the other of the housing and the movable member. With this arrangement, the check valve can be moved between the open and closed positions every time the movable member moves in the housing.

Alternatively, the sticking preventive mechanism may be configured to move the check valve between the open and closed positions utilizing displacement of a piston configured to be displaced under hydraulic pressure that acts on one side of the piston when the brakes are applied by the driver, i.e. hydraulic pressure produced in the pressure chamber of the master cylinder or hydraulic pressure introduced into the boost chamber of the hydraulic booster (assist pressure).

Further alternatively, the sticking preventive mechanism may be configured to move the check valve between the open and closed positions by means of an electromagnetic actuator driven by a signal generated when the brake operation has started or the brakes have been released.

(3) A hydraulic booster including all of the features of the above type (1) hydraulic booster in which the at least one hydraulic line comprises a plurality of hydraulic lines arranged parallel to each other, and the at least one check valve comprises a plurality of check valves provided in the respective hydraulic lines.

If the at least one hydraulic line is provided between the boost chamber (or the pressure chamber of the master cylinder) and the atmospheric pressure reservoir, a relief valve is used as the check valve provided in the hydraulic line which is configured to open when the hydraulic pressure in the boost chamber or the master cylinder exceeds a predetermined value.

The hydraulic booster of any of the above types (1) to (3), which is used in a hydraulic brake system according to the present invention, is preferably one of the following hydraulic boosters (i) to (vi).

(i) a hydraulic booster wherein a portion of the hydraulic line and the check valve are provided in the boost piston or the master piston.

(ii) a hydraulic booster wherein the check valve includes a spherical valve body.

(iii) a hydraulic booster wherein the check valve includes a valve body having at least a portion thereof made of a rubber or a resin and configured to be brought into and out of abutment with a flat valve seat, thereby selectively opening and closing the hydraulic line.

(iv) a hydraulic booster including a housing in which the boost piston is mounted, wherein the hydraulic line is a gap defined in the housing and connecting the boost chamber to the auxiliary hydraulic pressure source, and wherein the check valve is an annular cup-shaped seal sealing an axially intermediate portion of the gap and having an opening facing a portion of the gap leading to the auxiliary hydraulic pressure source.

(v) a hydraulic booster including a housing in which the boost piston is mounted, wherein the hydraulic line is a gap defined in the housing and connecting the boost chamber to the auxiliary hydraulic pressure source, wherein the check valve is comprises an annular seal member received in an annular groove formed in an axially intermediate portion of the gap so as to be movable in the annular groove in an axial direction of the boost piston, the annular seal member having two opposed sides configured to receive hydraulic pressures of the auxiliary hydraulic pressure source and the boost chamber, respectively, wherein the annular seal member, is configured to be kept in a position where the seal member closes an opening of the annular groove facing a portion of the gap leading to the boost chamber except when the hydraulic pressure of the boost chamber is higher than the hydraulic pressure of the auxiliary hydraulic pressure source by a predetermined value, and configured to open the opening of the annular groove facing the portion of the gap leading to the boost chamber such that the boost chamber communicates with the auxiliary hydraulic pressure source through the gap, only when the hydraulic pressure of the boost chamber is higher than the hydraulic pressure of the auxiliary hydraulic pressure source by the predetermined value.

(vi) the hydraulic booster as defined in item (v) above, wherein the annular seal member is received in the annular groove so as to be reciprocable in the axial direction of the boost piston, and wherein the hydraulic booster further includes an O-ring positioned in the annular groove and configured to be pressed against a radially outer surface or a radially inner surface of the annular seal member, thereby sealing between the annular seal member and a bottom surface of the annular groove, when the annular seal member is in the position where the seal member closes the opening of the annular groove facing the portion of the gap leading to the boost chamber.

The hydraulic boosters (iv), (v) and (vi) are each arranged in a hydraulic brake system such that the hydraulic line, which includes the check valve, is provided between the boost chamber (or the pressure chamber of the master cylinder) and the auxiliary hydraulic pressure source.

(4) A hydraulic brake system including one of the above-described boosters (1) to (3), a brake operating member configured to apply a brake operating force to the hydraulic booster, a master cylinder including a master piston configured to be actuated while receiving an assisting force from the hydraulic booster, thus producing a hydraulic pressure in the master cylinder, wheel cylinders configured to produce a braking force under the hydraulic pressure supplied from the master cylinder, a circulation type pressure control unit including pressure reducing solenoid valves for releasing hydraulic pressure in the respective wheel cylinders, pressure increasing solenoid valves for introducing hydraulic pressure into the respective wheel cylinders, and a circulating pump for drawing brake fluid discharged from the wheel cylinders through the pressure reducing solenoid valves and returning the thus drawn brake fluid into a hydraulic line extending from the master cylinder to the wheel cylinders, and an electronic control unit which determines whether it is necessary to reduce pressure or reincrease pressure in the respective wheel cylinders and controls the corresponding pressure reducing and pressure increasing solenoid valves based on the determination.

(5) A hydraulic brake system having all of the features of the brake system of type (4) above, and further including a controller configured to monitor at least one of the master cylinder pressure and the boost pressure, and to stop the pump from drawing brake fluid if the detected pressure exceeds a predetermined threshold. The master cylinder and/or the boost pressure may be directly detected by a pressure sensor, or may be estimated from the electric power (current or voltage) supplied to the pressure increasing and reducing solenoid valves or to the motor for driving the pump, of the circulation type pressure control unit.

By monitoring the master cylinder pressure or boost pressure by means of a pressure sensor, if the master cylinder pressure or boost pressure exceeds the pressure at which the check valve is supposed to open, it is possible to infer that the check valve is stuck. Thus, by stopping the pump from drawing brake fluid in such a situation, it is possible to prevent an abnormal rise in master cylinder pressure and boost pressure.

If the hydraulic brake system includes pressure increasing and reducing solenoid valves as described above, by configuring the electronic control unit such that the currents or voltages supplied to the respective solenoid valves correspond to the differential pressure between the master cylinder pressure and the respective wheel cylinder pressures, in the manner as described in detail in the below-described JP Patent Publications 2003-19952A and 2007-91051A, it is possible to estimate the master cylinder pressure from the currents or voltages supplied to the solenoid valves. The current or voltage supplied to the motor for driving the pump of circulation type pressure control unit also varies with the load, it is possible to estimate the master cylinder pressure from the current or voltage for driving this motor too. Thus, the pump may also be controlled to stop drawing brake fluid if the thus estimated master cylinder pressure exceeds the threshold.

Advantages of the Invention

In the hydraulic booster and the hydraulic brake system according to the present invention, when the piston of the master cylinder and the boost piston are pushed back due to the pump back flow, the check valve opens under the increased pressure in the boost chamber, releasing the pressure in the boost chamber into the auxiliary hydraulic pressure source or into the atmospheric pressure reservoir. This prevents an excessive rise in pressure in the boost chamber, which in turn prevents reduced durability and possible breakage of the master cylinder and the hydraulic booster due to excessive pressure.

By preventing excessive pressure rise in the boost chamber, good brake operating feeling is maintained too.

By adding the sticking preventive mechanism, it is possible to minimize the possibility of the check valve getting stuck, ensuring fail-safe operation.

In the arrangement in which there are a plurality of the hydraulic lines arranged in parallel to each other and each containing one of a plurality of the check valves, even if any one of the plurality of check valves gets stuck, the remaining normally operating check valve or valves serve the expected function. Thus, this arrangement provides more fail-safe operation.

In the arrangement in which the controller monitors the master cylinder pressure or the boost pressure and stops the pump from drawing brake fluid if the detected pressure exceeds the predetermined threshold, too, since the pump stops drawing brake fluid if the check valve gets stuck and the pressure cannot be released, it is possible to prevent abnormal rise in master cylinder pressure and boost pressure.

Preferably, the controller is used together with the check valve such that in an emergency where the check valve gets stuck, the controller stops the pump from drawing brake fluid. But this controller may used alone, i.e. without providing the check valve, such that the controller stops the pump from drawing brake fluid whenever necessary to prevent reduction in durability of the fluid seals and breakage of the master cylinder and the hydraulic booster due to pump back flow.

BEST MODE FOR EMBODYING THE INVENTION

Referring to FIGS. 1 to 17, description is made of the embodiments of the hydraulic booster according to the present invention and the hydraulic brake system including this hydraulic pressure booster.

Figure 1:
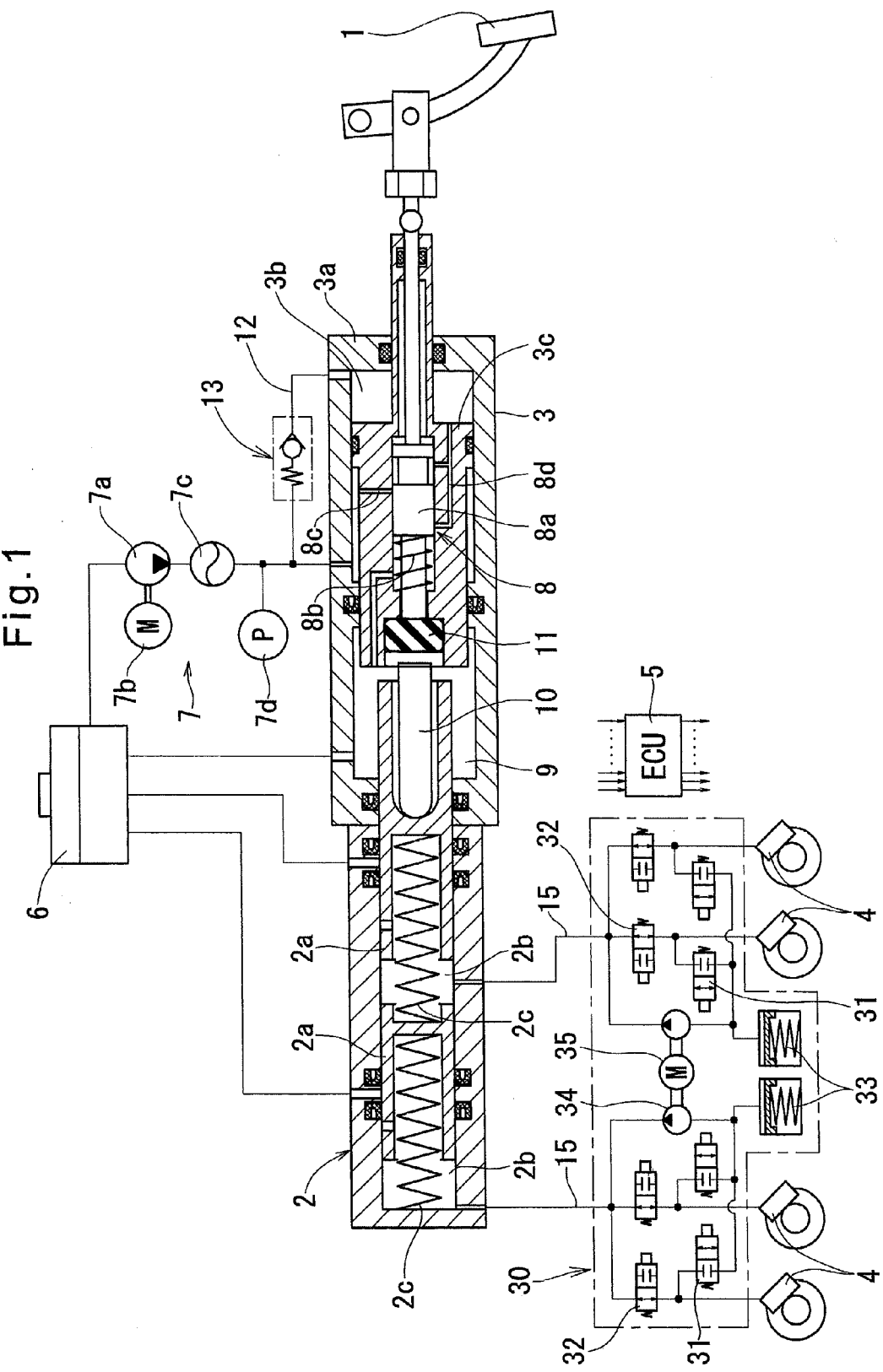
FIG. 1 is a schematic sectional view of a hydraulic booster and a hydraulic brake system, according to a first embodiment of the present invention.

The hydraulic brake system shown in FIG. 1 (first embodiment) includes a brake operating member 1 (which is a brake pedal in the embodiment shown), a master cylinder 2, a hydraulic booster 3, wheel cylinders 4 which generate braking force based on hydraulic pressure supplied from the master cylinder 2, a circulation type pressure control unit 30, and an electronic control unit 5. The brake system further includes an atmospheric pressure reservoir 6 as a replenishing fluid source. The brake system further includes sensors which supply information necessary for the electronic control unit 5 to determine whether to increase or reduce the pressures of the respective wheel cylinders 4. But these sensors are not shown.

The master cylinder 2 shown is a known tandem master cylinder including master pistons 2a and return springs 2c, in which hydraulic pressure is generated in pressure chambers 2b by driving the master pistons 2a.

The hydraulic booster 3 includes an auxiliary hydraulic pressure source 7, and a pressure regulator 8 disposed between the auxiliary hydraulic pressure source 7 and a boost chamber 3b. The pressure regulator 8 adjusts the hydraulic pressure supplied from the auxiliary hydraulic pressure source 7 to a pressure corresponding to the operating amount of the brake operating member 1, and introduces the thus adjusted hydraulic pressure into the boost chamber 3b.

The hydraulic pressure (boost pressure) introduced into the boost chamber 3b is applied to a boost piston 3c of the hydraulic booster 3 as an assisting force, so that the boost piston 3c drives the master pistons 2a of the master cylinder with an assisted force (driving force). The hydraulic booster 3 further includes a hydraulic line 12 and a check valve 13, which are characterizing features of the present invention. Through the hydraulic line 12, the boost chamber 3b communicates with the auxiliary hydraulic pressure source 7. The check valve 13 is provided in the hydraulic line 12.

The auxiliary hydraulic pressure source 7 includes a pump 7a, a motor 7b for driving the pump 7a, a pressure accumulator 7c, and a pressure sensor 7d. The motor 7b is selectively turned on and off based on the signal from the pressure sensor 7d to keep the hydraulic pressure accumulated in the pressure accumulator 7c between predetermined upper and lower thresholds.

The pressure regulator 8 includes a spool valve 8a which is displaced under the operating force from the brake operating member 1, and a return spring 8b for the spool valve 8a. The pressure regulator 8 further includes an inlet passage 8c and a discharge passage 8d both formed in the boost piston 3c.

The inlet passage 8c and the discharge passage 8d are selectively opened when the spool valve 8a is displaced. When the inlet passage 8c opens, the boost chamber 3b communicates with the auxiliary hydraulic pressure source 7. When the discharge passage 8d opens, the boost chamber 3b communicates with the atmospheric pressure reservoir 6 through a fluid chamber 9.

The pressure regulator 8 thus selectively brings the boost chamber 3b into communication with one of the auxiliary hydraulic pressure source 7 and the atmospheric pressure reservoir 9, or shuts off the boost chamber 3b both from the auxiliary hydraulic pressure source 7 and the atmospheric pressure reservoir 9, by the displacement of the spool valve 8a. Thus, the pressure regulator 8 adjusts the hydraulic pressure introduced into the boost chamber 3b from the auxiliary hydraulic pressure source 7 (boost pressure) to a value corresponding to the operating amount of the brake operating member. Since this pressure control mechanism itself is well known, its detailed description is omitted here.

The boost piston 3c is advanced under the boost pressure generated in the boost chamber 3b, and its thrust force (assisted force) is transmitted to the master pistons 2a in the master cylinder 2 through a power transmission member 10 to drive the master pistons 2 and thus to generate brake hydraulic pressure in the pressure chambers 2b. In this tandem master cylinder, when the master piston 2a on the right-hand side in FIG. 1 is driven and hydraulic pressure is generated in the right-hand pressure chamber 2b, the left-hand master piston 2a is also driven under the hydraulic pressure in the right-hand pressure chamber 2b. This generates hydraulic pressure in the left-hand pressure chamber 2b which is equal to the hydraulic pressure in the right-hand pressure chamber 2b.

The pressures generated in the respective pressure chambers 2b of the master cylinder is balanced with the boost pressure in the boost chamber 3b. The reaction force of the pressures in the pressure chambers 2b is transmitted from the master pistons 2a to the brake operating member 1 through the power transmission member 10, a rubber disk 11 and the spool valve 8a. The rubber disk 11 serves to create a reaction force corresponding to the brake operating amount. The rubber disk 11 is a preferred element but is not an essential one.

Figure 3:
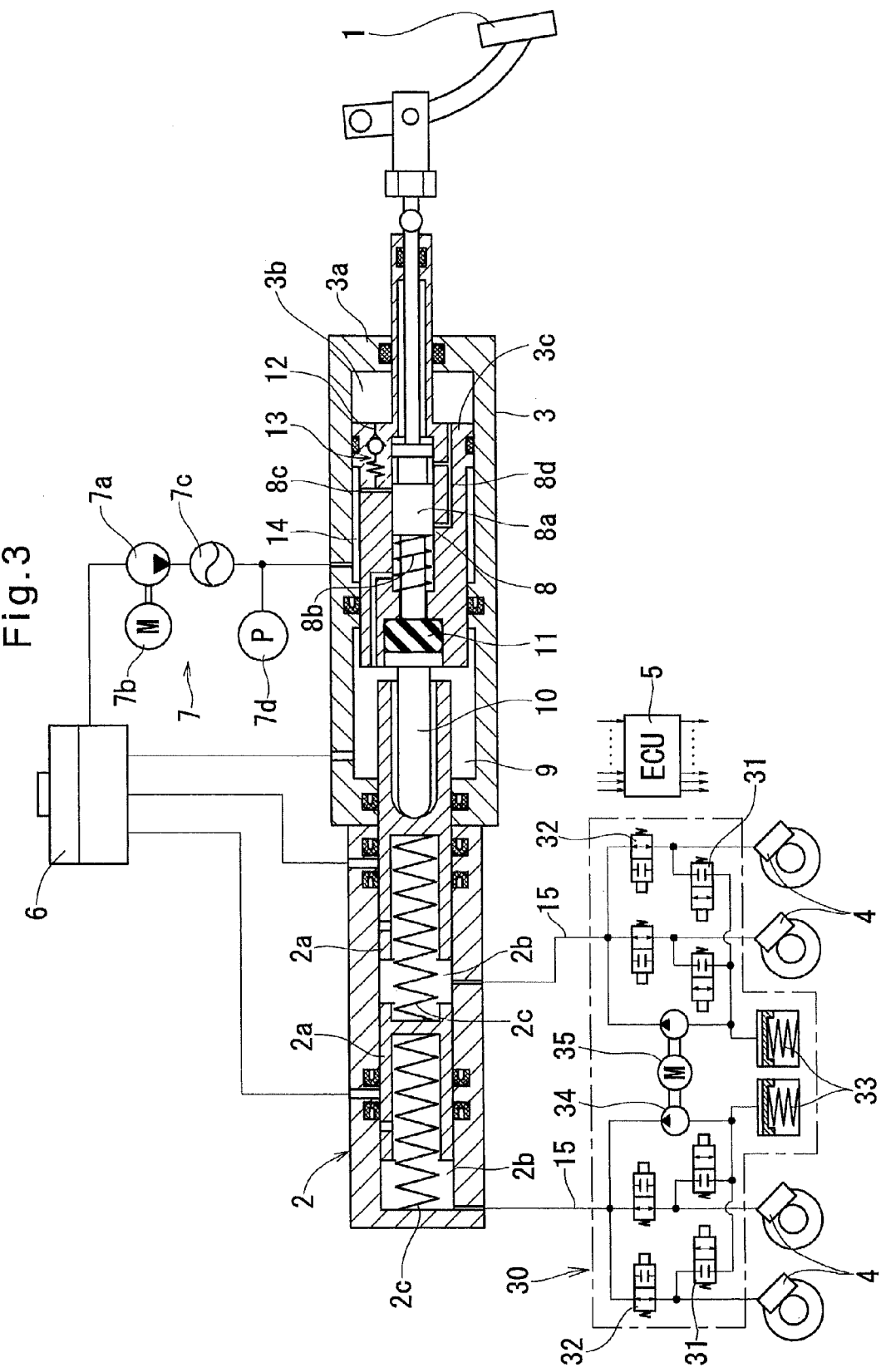
FIG. 3 is a sectional view of a hydraulic brake system including a check valve provided in a boost piston (modification of the first embodiment).

For compactness of the entire system, the hydraulic line 12 and the check valve 13 are preferably provided in the boost piston 3c as shown in FIG. 3. But as shown in FIG. 1, the hydraulic line 12 may be provided outside the housing 3a, with the check valve 13 provided in this hydraulic line 12.

The hydraulic line 12 in FIG. 3 is a hole formed in the boost piston 3c and connecting the boost chamber 3b with an intermediate chamber 14. The intermediate chamber 14 is defined between the boost piston 3c and the housing (cylinder member) 3a, in which the boost piston 3c is mounted, and communicates with the auxiliary hydraulic pressure source 7 at all times.

The check valve 13 permits a fluid flow from the boost chamber 3b toward the auxiliary hydraulic pressure source 7, and prevents a fluid flow in the reverse direction. The check valve 13 includes a valve body which receives the hydraulic pressures in the boost chamber 3b and the auxiliary fluid pressure source 7 at the opposed ends thereof, and a spring biasing the valve body toward the closed position. When the hydraulic pressure in the boost chamber 3b becomes higher than the hydraulic pressure in the auxiliary hydraulic pressure source 7 by a predetermined value, the valve body moves due to the difference in hydraulic pressure, and the check valve 13 opens.

The circulation type pressure control unit 30 is a known unit including pressure reducing solenoid valves 31, pressure increasing solenoid valves 32, low-pressure fluid reservoirs 33 for temporarily storing brake fluid discharged from the wheel cylinders 4, circulation pumps 34 for drawing brake fluid discharged from the wheel cylinders 4 and returning the thus drawn brake fluid into hydraulic lines 15 extending from the master cylinder 2 to the respective wheel cylinders 4, and a motor 35 for driving the pumps 34.

The pressure reducing valves 31 and the pressure increasing valves 32 of the circulation type pressure control unit 30 may be on-off solenoid valves or known linear solenoid valves, in which the degree of opening of the valve portion is adjustable according to the intensity of a current applied to the coil.

In the hydraulic brake system of FIG. 1, when the pumps 34 are activated by the electronic control unit 5 during braking, the master pistons 2a of the master cylinder 2 and the boost piston 3c are pushed back due to pump back flow. At this time (i.e. while the pumps 34 are being activated), the boost chamber 3b is separated from both the atmospheric pressure reservoir 6 and the auxiliary hydraulic pressure source 7, and thus sealed.

When the boost piston 3c is pushed back in this state, the hydraulic pressure in the boost chamber 3b rises above the hydraulic pressure in the auxiliary hydraulic pressure source 7. When the difference in hydraulic pressure therebetween (differential pressure) exceeds a predetermined value thereafter, the check valve 13 opens under the differential pressure, releasing the hydraulic pressure in the boost chamber 3b into the auxiliary hydraulic pressure source 7. This prevents an excessive rise in pressure in the boost chamber 3b, thus eliminating the possibility of reduced durability, as well as breakage, of the master cylinder and the hydraulic booster due to abnormal pressure rise, and also improves brake pedal feel.

Figure 2:
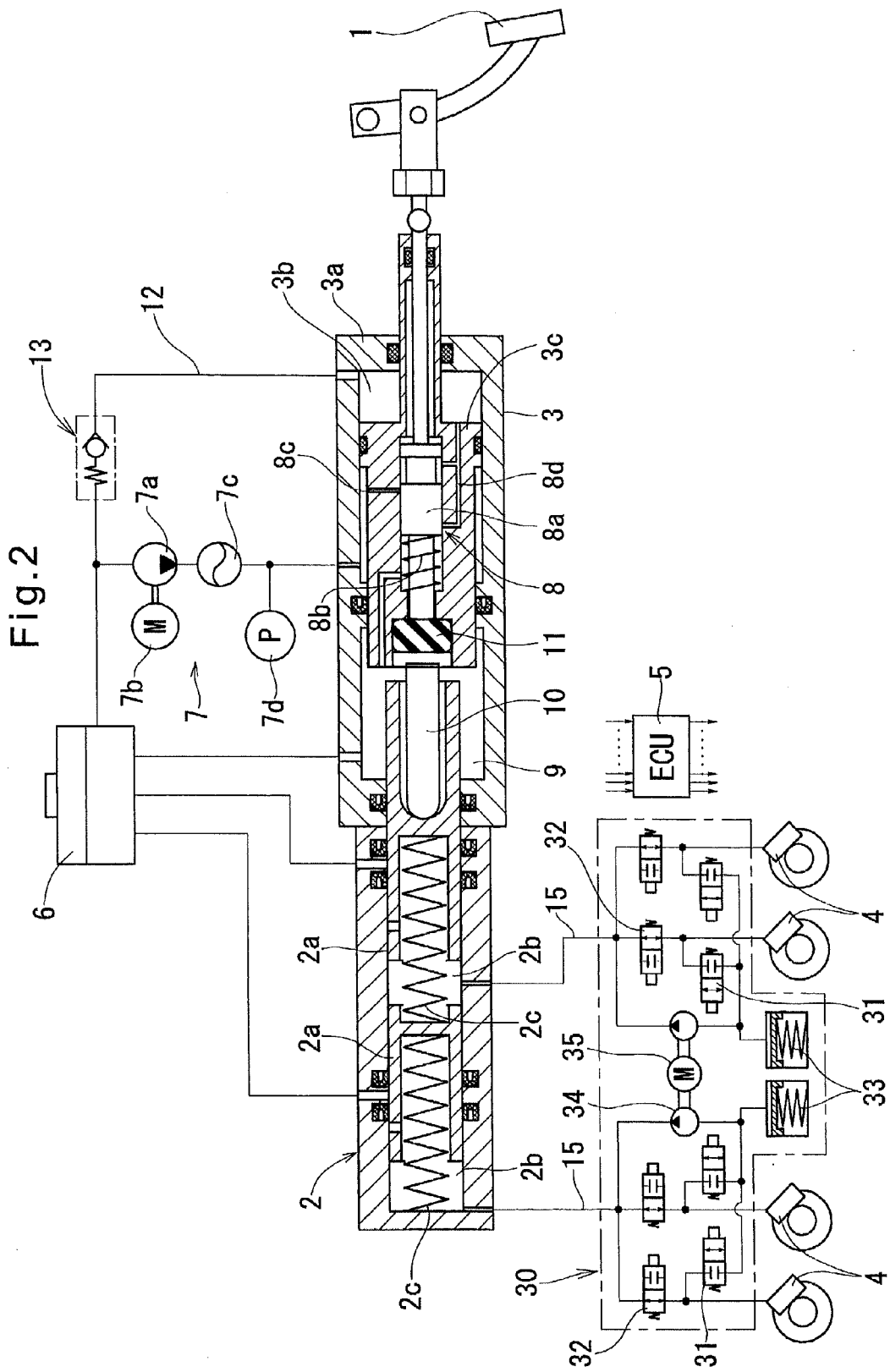
FIG. 2 is a schematic sectional view of a hydraulic booster and a hydraulic brake system, according to a second embodiment of the present invention.

FIG. 2 shows the hydraulic brake system of the second embodiment, in which the hydraulic line 12 is provided between the boost chamber 3b and the atmospheric pressure reservoir 6, with the check valve 13 provided in this hydraulic line 12. The check valve 13 of this embodiment is a relief valve which opens if the hydraulic pressure in the boost chamber 3b exceeds a predetermined value. The pressure at which the check valve 13 opens is preferably set at a value slightly higher than the upper limit of the boost pressure to be maintained so that when the pump back flow occurs, the hydraulic pressure in the boost chamber 3b is released into the atmospheric pressure reservoir 6 through the check valve 13, thereby preventing abnormal pressure rise in the boost chamber 3b.

Figure 4:
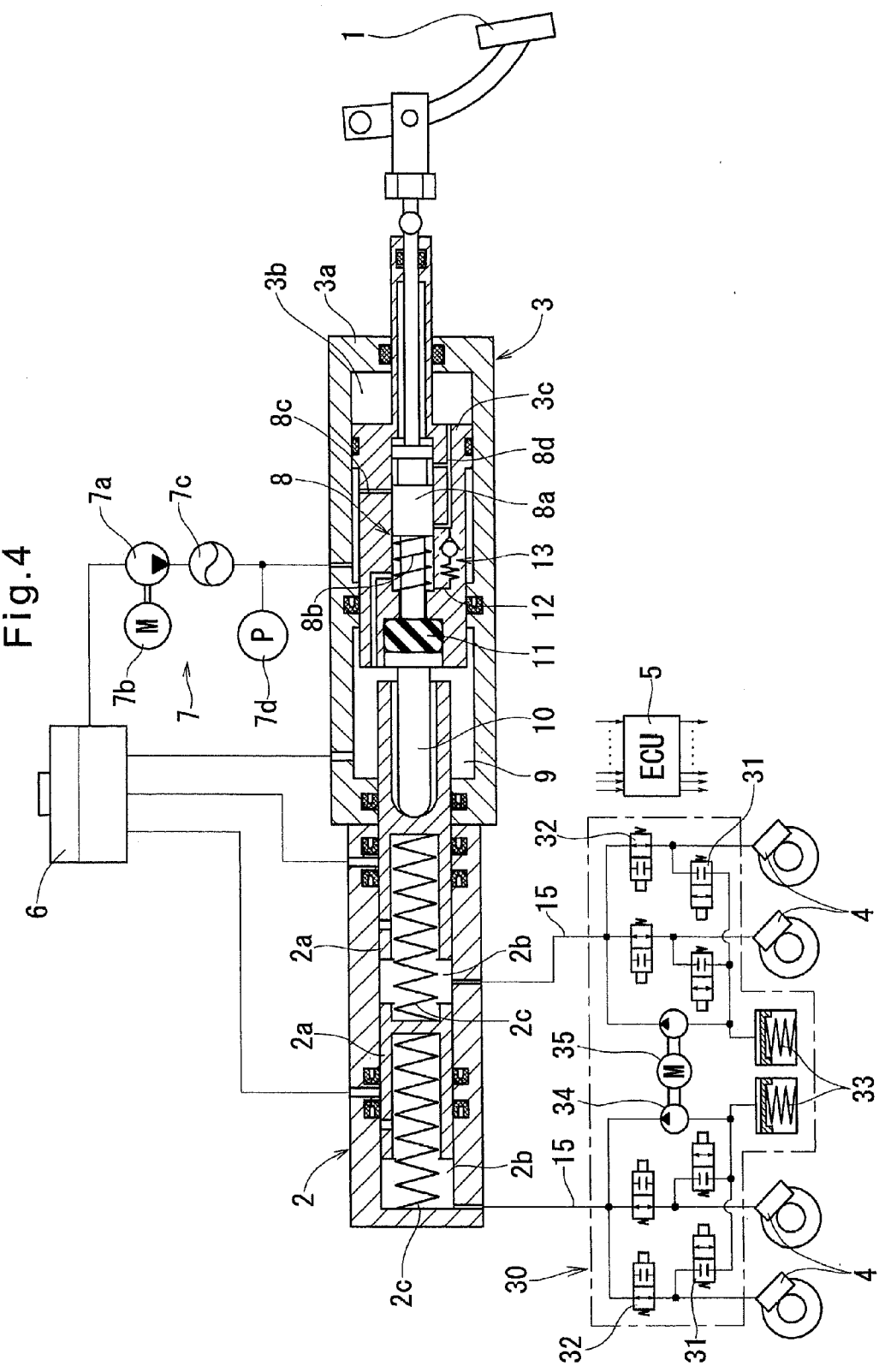
FIG. 4 is a sectional view of a hydraulic brake system including a check valve provided in a boost piston (modification of the second embodiment).
Figure 5:
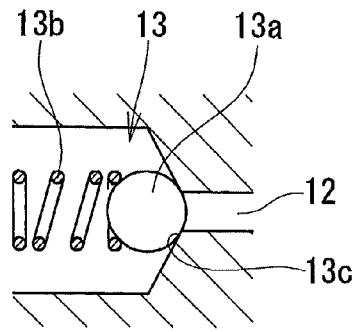
FIG. 5 is a sectional view of a check valve used in this invention.

In the second embodiment too, for compactness of the hydraulic brake system, the hydraulic line 12 and the check valve 13 are preferably provided in the boost piston 3c as shown in FIG. 4. In FIG. 4, the hydraulic line 12 opens to the fluid chamber 9, so that the boost chamber 3b communicates with the atmospheric pressure reservoir 6 through the fluid chamber 9.

The check valve 13 used in the hydraulic booster of the present invention is preferably of one of the types shown in FIGS. 5 to 9. The check valve 13 shown in FIG. 5 includes a spherical valve body 13a biased by a spring 13b toward a valve closing position where the valve body 13a is pressed against a conical valve seat 13c. This valve is simple in structure and thus is high in productivity.

Figure 6:
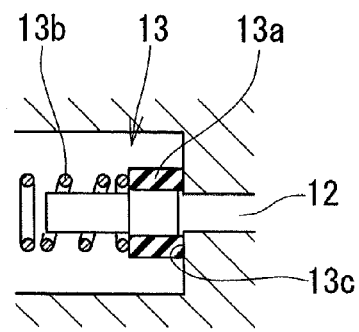
FIG. 6 is a sectional view of another check valve used in this invention.

The check valve 13 of FIG. 6 includes a valve body 13a having at least its portion to be brought into abutment with a flat valve seat 13c made of rubber or resin. By moving the valve body 13a into and out of contact with the valve seat 13c, the hydraulic line 12 is selectively opened and closed. The check valve 13 of FIG. 6 is also simple in structure and is high in productivity.

Figure 8:
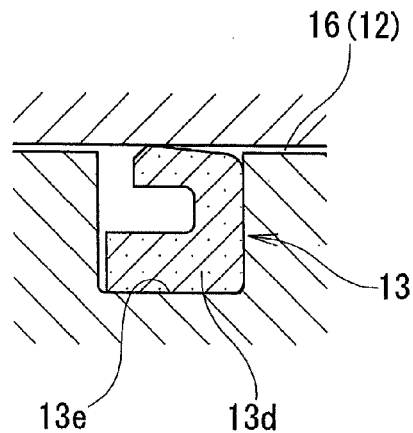
FIG. 8 is a sectional view of a cup-shaped seal used as each of the check valves of FIG. 7.

The check valve 13 of FIG. 8 is used in the hydraulic brake system of the first embodiment (shown in FIG. 3), and includes an annular cup seal 13d provided in a gap 16 through which the boost chamber 3b communicates with the auxiliary hydraulic pressure source 7 so as to seal the gap 16. Specifically, the cup seal 13 is fitted in an annular seal groove 13e formed at an intermediate portion of the gap 16 with the opening of the cup member 13d facing the portion of the gap 16 leading to the auxiliary hydraulic pressure source 7.

Figure 7:
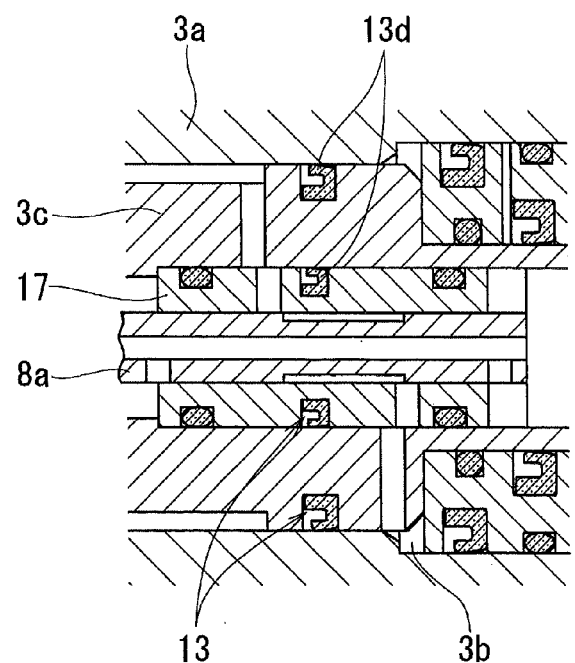
FIG. 7 is a sectional view of still another check valves used in this invention, showing the locations where these check valves are provided.

The gap 16 shown is one that inevitably forms in the housing 3a, in which the boost piston 3c is mounted, for structural reasons of the hydraulic booster. As shown in FIG. 7, such an inevitable gap 16 forms between a cylinder chamber defined in the housing 3a and the boost piston 3c, which is inserted in the cylinder chamber, or between the boost piston 3c and a guide sleeve 17 disposed between the boost piston 3c and the spool valve 8a. The boost chamber 3b communicates with the auxiliary hydraulic pressure source 7 through this gap 16. Thus, it has been an ordinary practice to provide an interfacial seal member in the gap 16 to seal between the boost piston 3c and the spool valve 8a.

According to the present invention, instead of such a necessary conventional interfacial seal member, the cup seal shown in FIG. 8 is used and positioned as shown in FIG. 8 as the check valve 13 of the present invention. The gap 16 may be a newly formed gap. But preferably, the cup seal forming the check valve of FIG. 8 is fitted in the above-described inevitably forming gap 16, instead of the conventional interfacial seal member such as an O-ring, to avoid an increase in the number of parts and thus minimize the cost.

Figure 9:
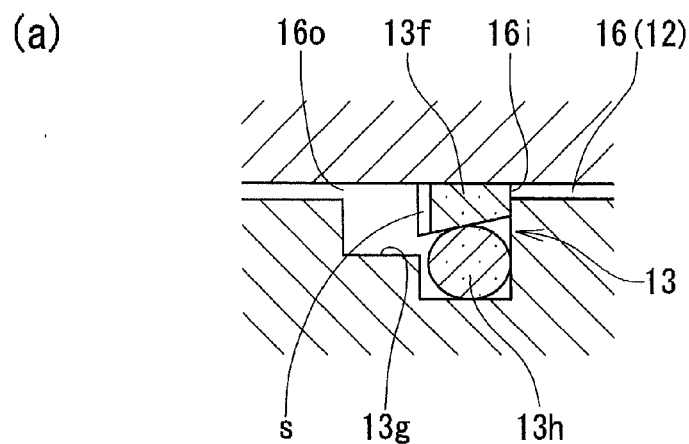
FIG. 9(a) is a sectional view of a yet another check valve used in this invention, showing its closed position.
FIG. 9(b) is a sectional view of the check valve of FIG. 9(a), showing its open position.
Figure 9:
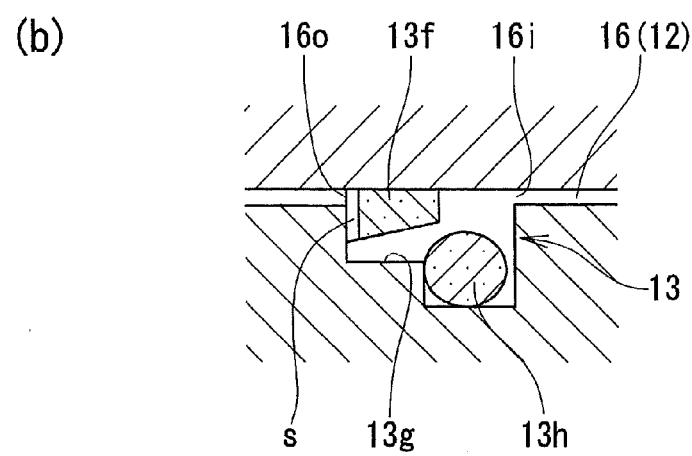

The check valve 13 of FIGS. 9(a) and 9(b) is also used in the hydraulic brake system of the first embodiment (shown in FIG. 3). This check valve 13 is also provided in a gap 16 that is present in the housing 3a and through which the booster chamber 3b communicates with the auxiliary hydraulic pressure source 7. The check valve 13 of FIG. 9 includes an annular seal member 13f having a wedge-shaped section and having opposed end surfaces on which hydraulic pressures of the auxiliary hydraulic pressure source 7 and the boost chamber 3b act, respectively. The annular seal member 13f is received in an annular groove 13g so as to be movable in the direction of the axis of the boost piston 3c.

The left-hand (in FIGS. 9(a) and 9(b)) one of the end surfaces of the annular seal member 13f is formed with a passage in the form of a slit s thorough which the opening 16i of the annular groove 13g facing the portion of the gap 16 leading to the boost chamber communicates with the opening 16o of the annular groove 13g facing the portion of the gap 16 leading to the auxiliary hydraulic pressure source while the left-hand end surface of the annular seal member is in contact with the end wall of the annular groove 13g.

The annular seal member 13f is held in a position where the seal member 13f closes the opening 16i, which faces toward the boost chamber, under the hydraulic pressure of the auxiliary hydraulic pressure source 7, except when the hydraulic pressure of the boost chamber 3b is higher by a predetermined value or over than the hydraulic pressure of the auxiliary hydraulic pressure source 7. When the hydraulic pressure of the boost chamber 3b exceeds the hydraulic pressure of the auxiliary hydraulic pressure source 7 by the above predetermined value or over, the opening 16i, which faces toward the boost chamber, opens. When the opening 16i opens, the boost chamber 3b communicates with the auxiliary hydraulic pressure source 7 through the gap 16, so that the hydraulic pressure of the boost chamber 3b is released into the auxiliary hydraulic pressure source 7.

The annular seal member 13f of the check valve 13 of FIG. 9 is preferably made of a hard resin harder than a rubber. This is because an annular seal member 13f made of such a hard resin can sufficiently withstand the hydraulic pressure difference created between the boost chamber 3b and the auxiliary hydraulic pressure source 7, and thus exhibits sufficient durability when used in such an environment.

In the arrangement of FIG. 9, the member formed with the annular groove 13g (which may be the guide sleeve 17) may be integrally formed with a tapered surface corresponding to the tapered surface of the annular seal member 13f such that this tapered surface serves a valve seat on which the annular seal member 13f is configured to be seated when in the closed position.

If the annular seal member 13f is made of a hard resin, as shown in FIG. 9, the check valve preferably further includes an O-ring 13h mounted in the annular groove 13g and adapted to keep the annular seal member 13f in the closed position by coming into close contact with the radially inner surface of the annular seal member 13f (or with the radially outer surface of the annular seal member 13f if the annular groove 13g is located radially outwardly of the annular seal member 13f). This sealing arrangement provides a more stable seal than a combination of a hard valve body and a hard valve seat.

In the above embodiments, the hydraulic line 12 and the check valve 13 are provided between the boost chamber 3b and the auxiliary hydraulic pressure source 7 (or atmospheric pressure reservoir 6). But they may be provided between the pressure chambers 2b of the master cylinder and the auxiliary hydraulic pressure source 7. In this arrangement too, the check valve 13 is a relief valve configured to open only if the master cylinder pressure exceeds a predetermined value.

Figure 10:
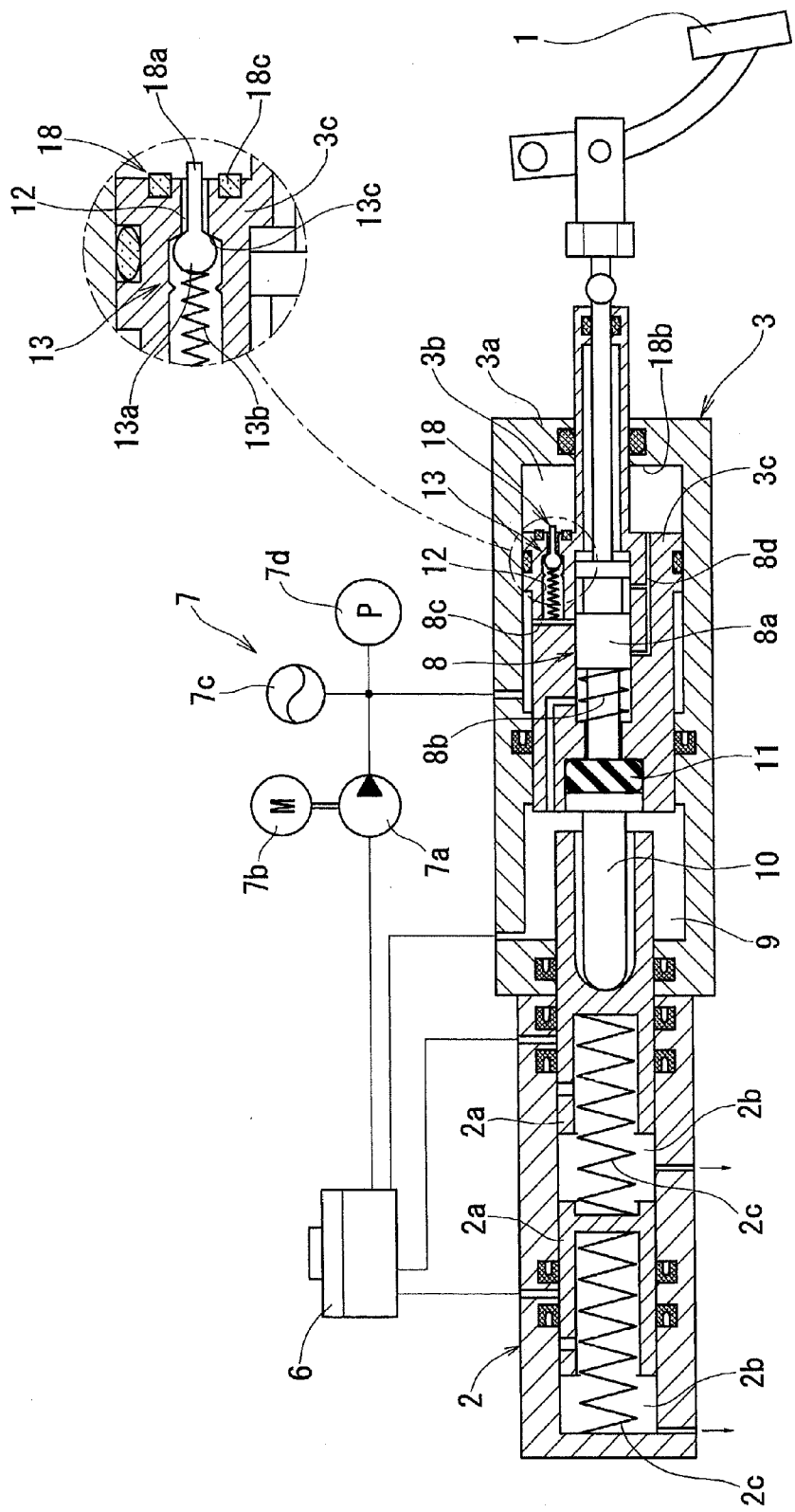
FIG. 10 is a schematic sectional view of a hydraulic booster including a sticking preventive mechanism for the check valve.

FIG. 10 shows a hydraulic booster including means for preventing the check valve 13 from getting stuck. The arrangement of FIG. 10 is identical to the hydraulic brake system of FIG. 3 in that the boost chamber 3b is connected to the auxiliary hydraulic source 7 through the hydraulic line 12, with a portion of the hydraulic line 12 provided in the boost piston 3c and the check valve 13 also provided in the boost piston 3c. The arrangement of FIG. 10 differs from the hydraulic brake system of FIG. 3 in that it further includes a mechanism 18 for preventing sticking of the check valve 13.

The sticking preventive mechanism 18, which is provided in the hydraulic booster 3 of FIG. 10, includes a push pin 18a provided on the valve body 13a of the check valve 13, a stopper 18b for stopping the push pin 18a (in FIG. 10, the inner end surface of the housing 3a serves as the stopper 18b), and a valve seal 18c surrounding an opening of the hydraulic line 12 that opens to the boost chamber 3b.

The valve body 13a and the valve seat 13c of the check valve 13 are mounted in the boost piston 3c (such that the valve body 13a cannot come out of the boost piston 3c). When the main brakes (service brakes) are operated by the driver, and the boost piston 3c is advanced from its initial position (where the piston 3c is in abutment with the stopper 18b) to the position shown in FIG. 10, the check valve 13 is closed with the push pin 18a protruding into the boost chamber 3b.

When the driver releases the brakes and the boost piston 3c returns toward the initial position, the push pin 18a abuts the stopper 18b immediately before the piston 3c returns to the initial position. This separates the valve body 13a from the valve seat 13c, opening the check valve 13. Simultaneously, the valve seal 18c contacts the stopper 18b, closing the hydraulic line 12, thus closing fluid communication between the auxiliary hydraulic pressure source 7 and the boost chamber 3b through the hydraulic line 12.

The sticking preventive mechanism 18 causes the check valve 13 to be moved between the open and closed positions every time the brakes are operated by the driver. This eliminates the possibility of the check valve 13 being kept stationary for a long period of time, and thus prevents sticking of the check valve 13 due to the check valve 13 being kept stationary for a long period of time. In the arrangement of FIG. 10, since the check valve 13 and the sticking preventive mechanism 18 are mounted in the boost piston 3b, the entire system is small in size and takes up a smaller space.

Figure 11:
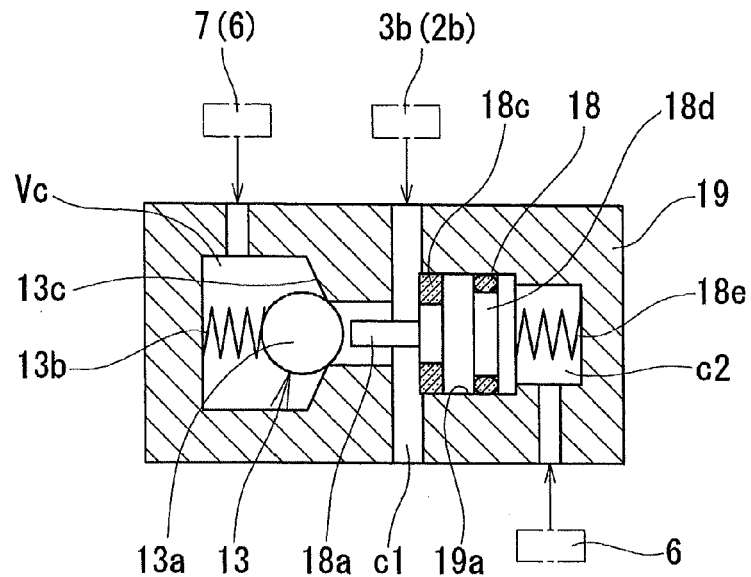
FIG. 11 is a sectional view of an example of the sticking preventive mechanism.

FIGS. 11 to 14 show different sticking preventive mechanisms 18. FIG. 11 shows a check valve 13 including a valve chamber Vc defined in a casing 19 and having a valve seat 13c, and a valve body 13a mounted in the valve chamber Vc. The casing 19, which includes the built-in check valve 13, further defines a cylinder 19a in which a piston 18d is mounted with one side of the piston 18d facing a fluid chamber c1 communicating with the boost chamber 3b or the pressure chambers 2b of the master cylinder, and its other side facing a fluid chamber c2 communicating with the atmospheric pressure reservoir 6. A valve seal 18c is mounted to the one side of the piston 18d.

The piston 18d is biased by a spring 18e toward the check valve 13. Thus, while the brakes are not being applied and thus no hydraulic pressure is being produced in the fluid chamber c1, a push pin 18a provided on the piston 18d pushes the valve body 13a, opening the check valve 13 while closing the hydraulic line 12 with the valve seal 18c.

When using this sticking preventing mechanism 18, the valve chamber Vc is brought into communication with one of the auxiliary hydraulic pressure source 7 and the atmospheric pressure reservoir 6; the fluid chamber c1 is brought into communication with the boost chamber 3b or the pressure chambers 2b of the master cylinder; and the fluid chamber c2 is brought into communication with the atmospheric pressure reservoir 6.

When the driver applies the brakes, and the assisted pressure or the master cylinder pressure is introduced into the fluid chamber c1, the piston 18d is pushed toward the fluid chamber c2, thus closing the check valve 13. Thus, in this arrangement too, the check valve 13 is opened or closed every time the brakes are operated by the driver.

Figure 12:
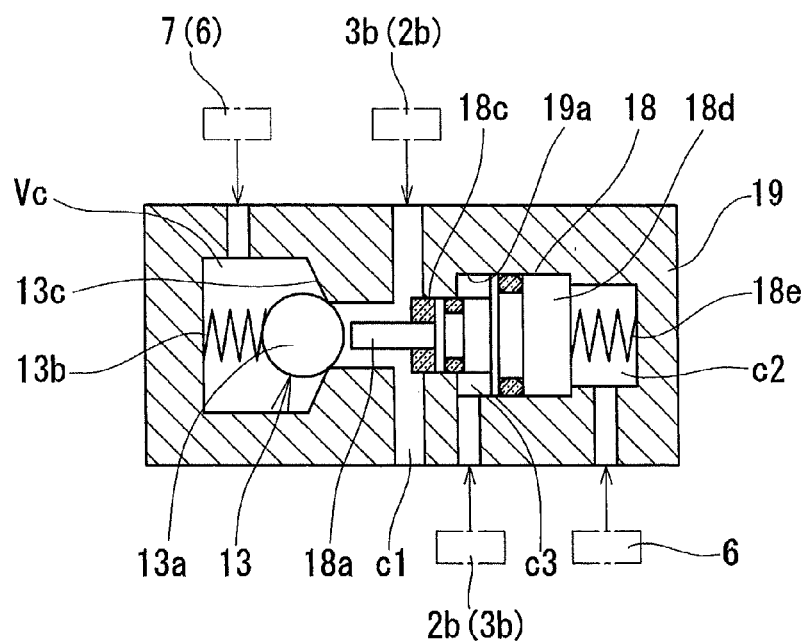
FIG. 12 is a sectional view of a different sticking preventive mechanism.

In the arrangement of FIG. 12, the piston 18d is a stepped piston configured such that hydraulic pressure introduced into the fluid chamber c1 and hydraulic pressure introduced into an additional fluid chamber c3 both act on the first side of the piston 18d. One and the other of the fluid chambers c1 and c3 communicate with the boost chamber 3b and the pressure chambers 2b of the master cylinder, respectively. Otherwise, the arrangement of FIG. 12 is structurally identical to the arrangement of FIG. 11. Its operation is identical to the arrangement of FIG. 11 too.

Figure 13:
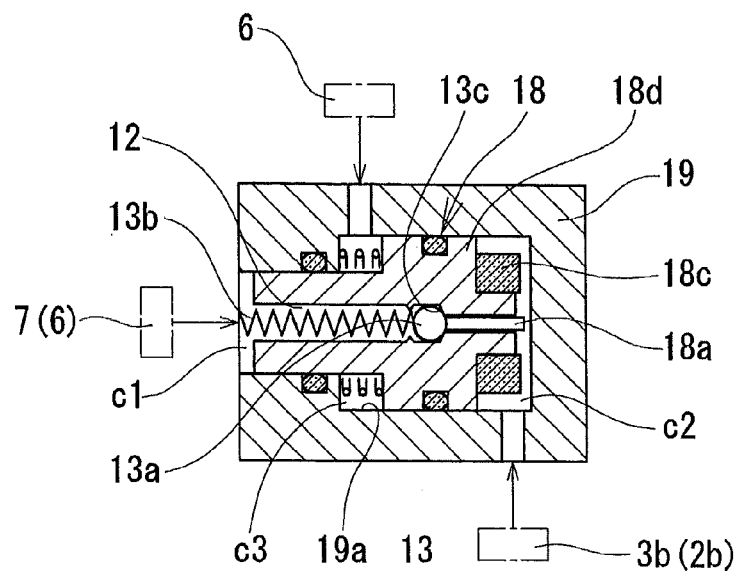
FIG. 13 is a sectional view of a still different sticking preventive mechanism.

In the arrangement of FIG. 13 too, the piston 18d is a stepped piston. The stepped piston 18d includes a small-diameter first end surface facing the fluid chamber c1, a shoulder surface facing the fluid chamber c3, and a second end surface facing the fluid chamber c2. In this arrangement, the piston 18d defines a passage which serves as a portion of the hydraulic line 12 and in which the check valve 13 is mounted.

In the arrangement of FIG. 13, the check valve 13 as well as the push pin 18a and the valve seal 18c of the sticking preventive mechanism are mounted in or to the piston 18d, which is a separate member from the boost piston 3c and movable under hydraulic pressure. The arrangement of FIG. 13 differs from the arrangement of FIG. 12 in that the fluid chamber c1 is connected to one of the auxiliary hydraulic pressure source 7 and the atmospheric pressure reservoir 6; the fluid chamber c3 is connected to the atmospheric pressure reservoir 6; and the fluid chamber c2 is connected to the boost chamber 3b or the pressure chambers 2b of the master cylinder.

The casing 19 of any of the arrangements of FIGS. 11 to 13 may be integral with or separate from the housing 3a of the hydraulic booster.

Figure 14:
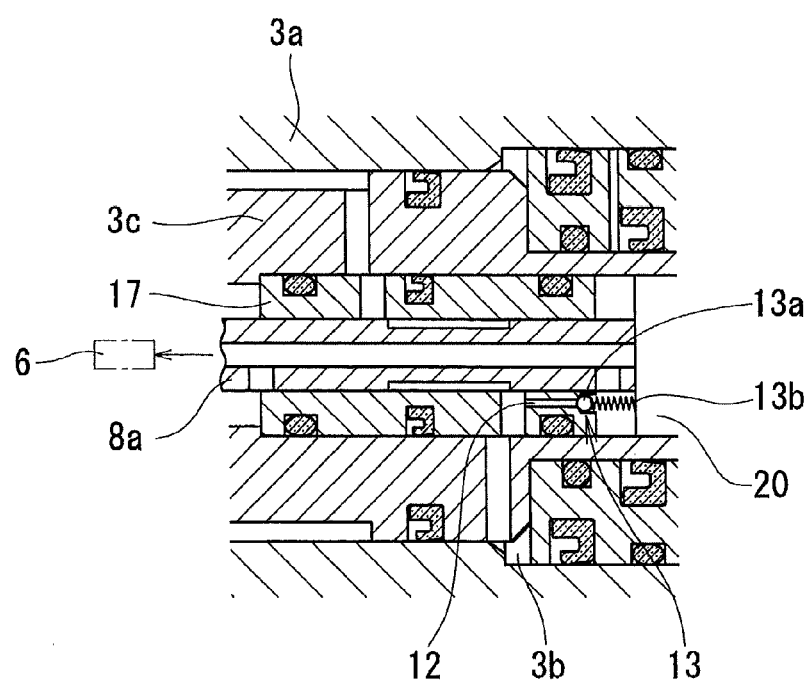
FIG. 14 is a sectional view of a yet different sticking preventive mechanism.

In the arrangement of FIG. 14, a guide sleeve 17 is mounted in the boost piston 3c and the spool valve 8a is inserted in the guide sleeve 17. The guide sleeve 17 defines a portion of the hydraulic line 12, which connects the boost chamber 3b to the atmospheric pressure reservoir 6. The check valve 13 is mounted in the guide sleeve 17. The check valve 13 includes a spring 13b having one end thereof fixed to an input piston 20 through which the brake operating force is transmitted to the spool valve 8a. The spring 13b has the other end thereof fixed to the valve body 13a.

In this arrangement, when the driver releases the brakes and the input piston 20 moves toward the initial position, the valve body 13a moves away from the valve seat 13c, opening the check valve 13. When the driver applies the brakes, the input piston 20 is advanced until the valve body 13a abuts the valve seat 13c, closing the check valve 13.

Figure 15:
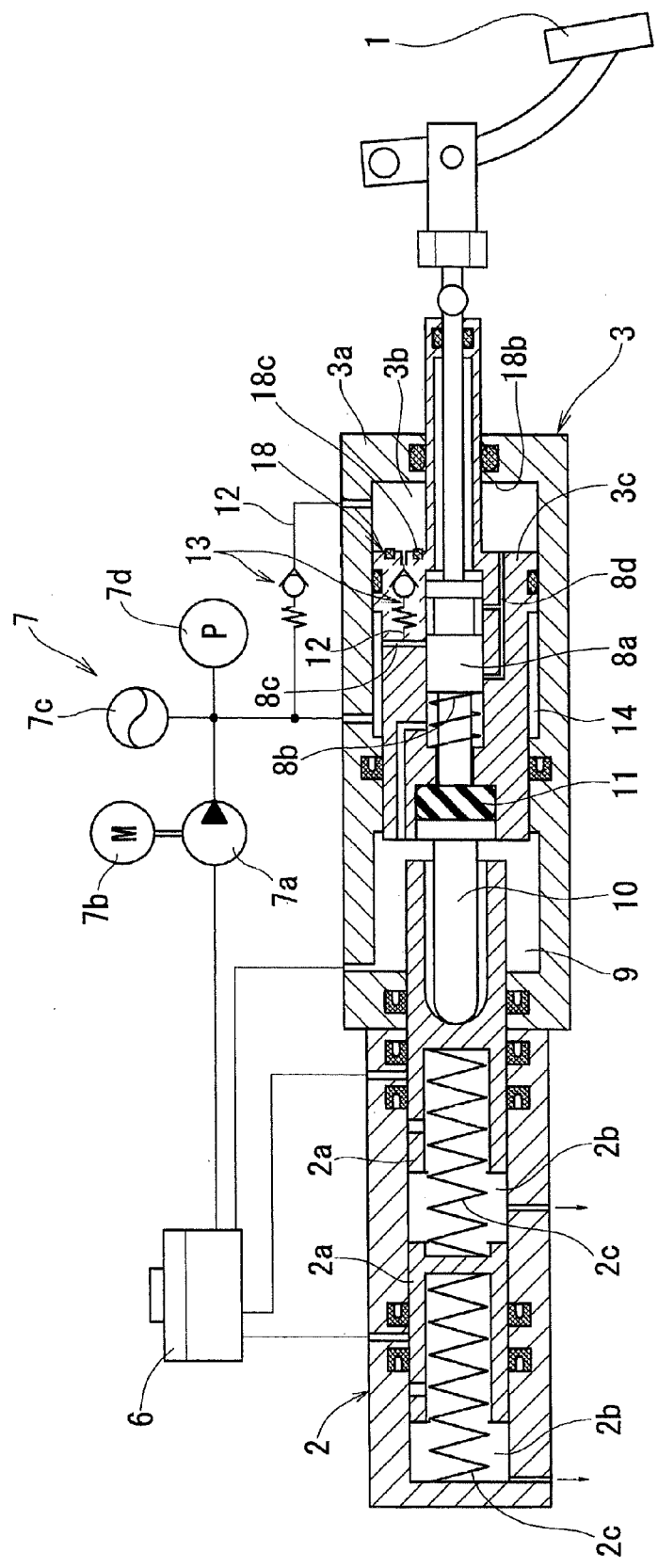
FIG. 15 is a schematic sectional view of a hydraulic booster including a plurality of hydraulic lines arranged parallel to each other and each containing a check valve.

FIG. 15 shows the hydraulic brake system of the third embodiment (elements downstream of the master cylinder 2 are not shown). To provide redundancy, the hydraulic booster 3 of the third embodiment includes a plurality of the hydraulic lines 12 arranged parallel to each other and each provided with a check valve 13. With this arrangement, even if one of the check valves gets stuck, the other check valve or valves function normally, thus minimizing the possibility of any abnormal rise in boost pressure and master cylinder pressure. This in turn ensures fail-safe operation of the brake system.

Figure 16:
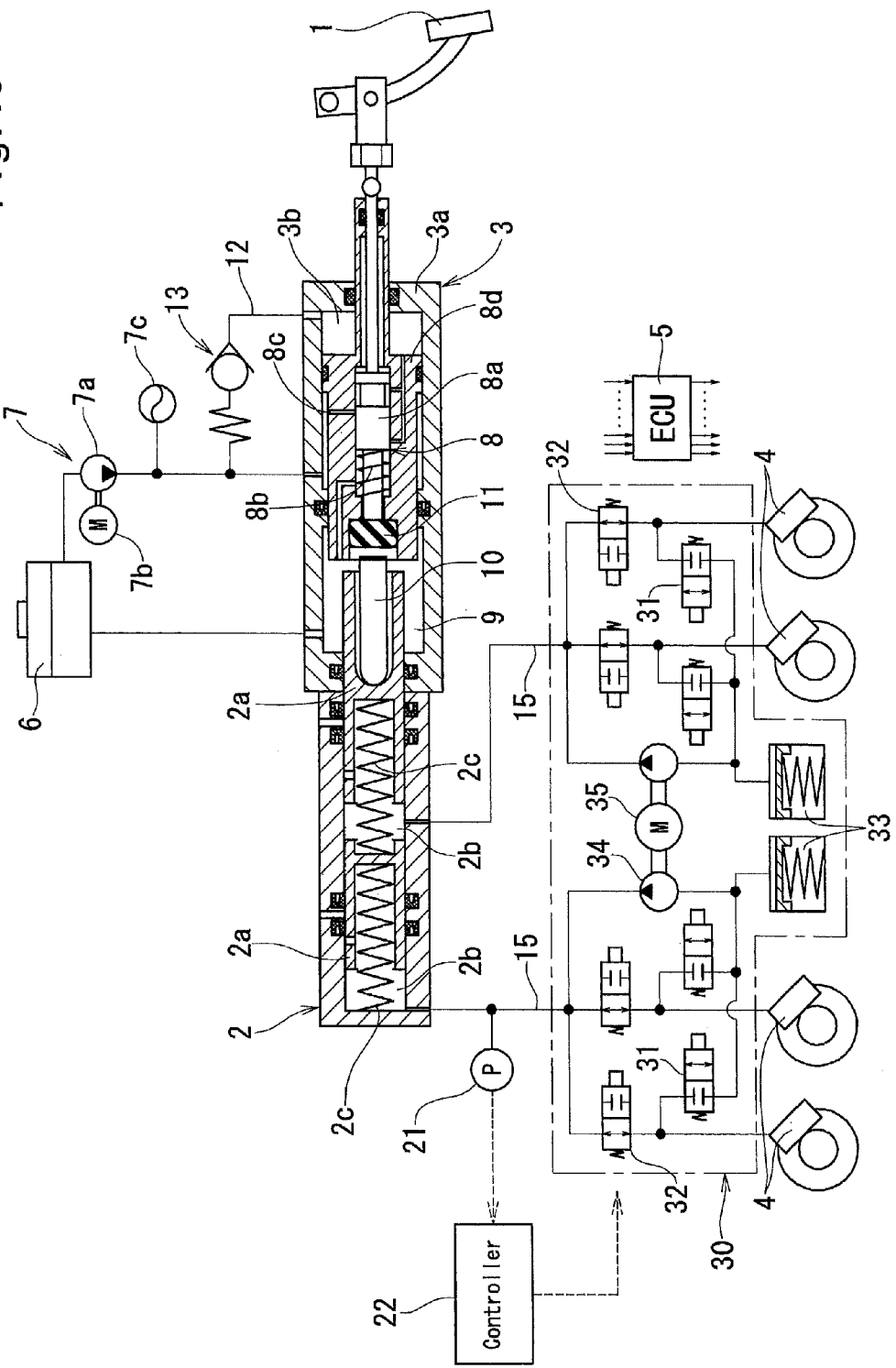
FIG. 16 schematically shows a hydraulic brake system having the function of stopping a pump from drawing brake fluid if the check valve gets stuck.
Figure 17:
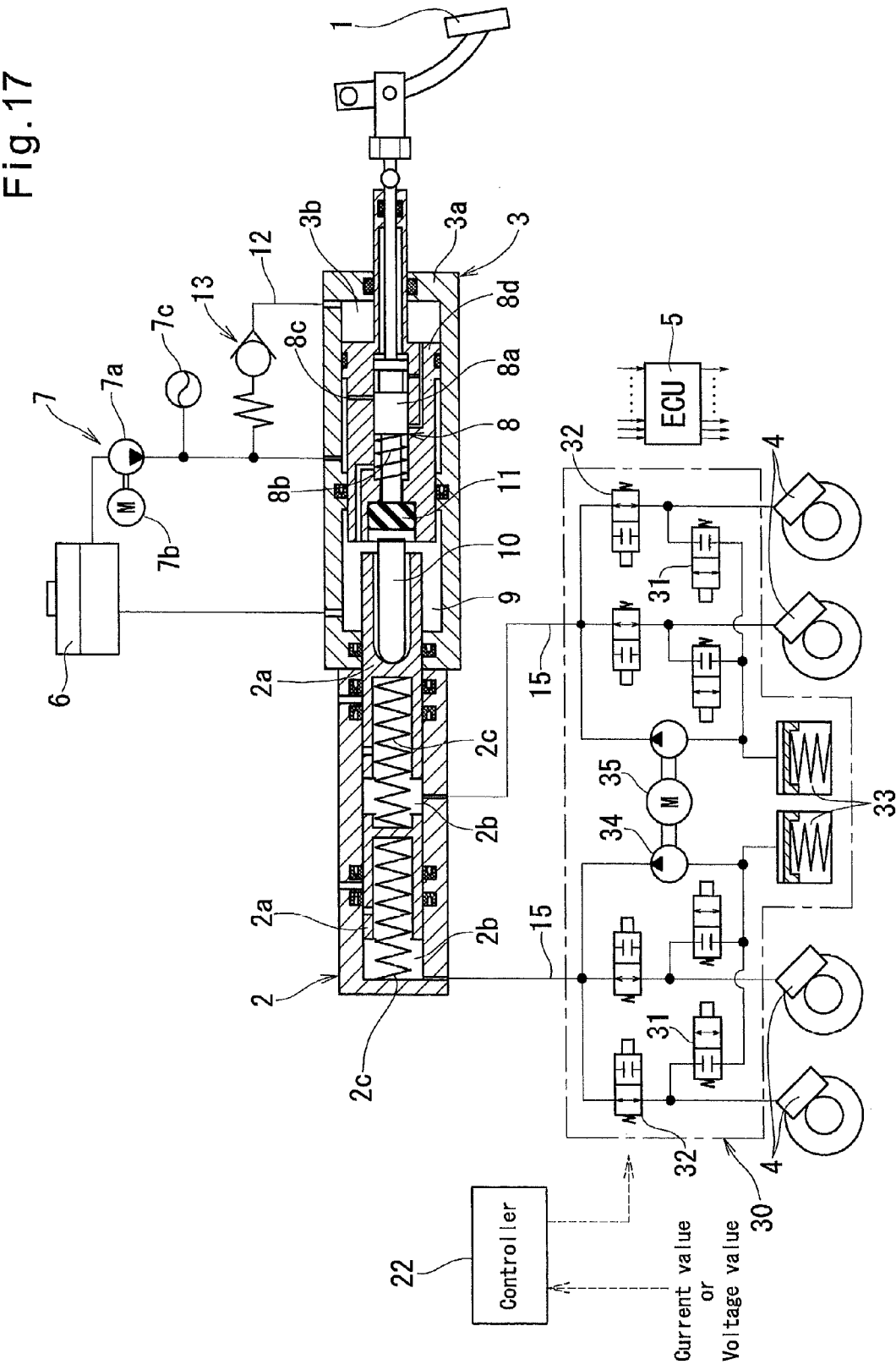
FIG. 17 schematically shows another hydraulic brake system having the function of stopping the pump from drawing brake fluid if the check valve gets stuck.

FIGS. 16 and 17 show the hydraulic brake system of the fourth embodiment. In order to prevent any abnormal rise in master cylinder pressure or boost pressure due to pump back flow even if the check valve 13 gets stuck, the brake system of the fourth embodiment has the function of detecting any sign of abnormal rise in boost pressure or master cylinder pressure due to pump back flow, and stopping the pumps of the circulation type pressure control unit from drawing brake fluid if such sign is detected.

The hydraulic brake system of FIG. 16 is identical to the hydraulic brake system of the first embodiment (the sticking preventive mechanism for the check valve is not shown) except that the brake system of FIG. 16 further includes pressure sensor 21 for detecting the master cylinder pressure and a controller 22. The controller 22 is configured to stop the pumps 34 of the circulation type pressure control unit 30 from drawing brake fluid if the master cylinder pressure exceeds a predetermined threshold. This arrangement may also be used in the hydraulic brake system of the second or third embodiment.

The above predetermined threshold is determined such that if the master cylinder pressure exceeds the value at which check valve 13 opens when the check valve is functioning normally, the controller stops the pumps from drawing brake fluid.

The pressure sensor may be used to monitor, not the master cylinder pressure, but the boost pressure such that the controller 22 stops the pumps 34 from drawing brake fluid if the boost pressure exceeds a predetermined threshold.

A hydraulic brake system including a circulation type pressure control unit has pressure increasing solenoid valves 32 and a pressure reducing solenoid valves 31. As disclosed in detail in JP Patent Publications 2003-19952A and 2007-91051A, a driving current supplied to each solenoid valve may be determined so as to correspond to the difference between the pressures upstream and downstream of the valve, based on the vehicle speed and the corresponding wheel speed. Since the driving current supplied to each solenoid valve is thus closely related to the load on the solenoid valve (i.e. difference between the pressures upstream and downstream of the valve), it is possible to estimate the master cylinder pressure by monitoring such currents.

Thus in the embodiment of FIG. 17 (in which the sticking preventive mechanism for the check valve is also not shown), the controller 22 monitors the currents or voltages supplied to the solenoid valves 31 and 32, or the vehicle speed and wheel speeds, and based on the thus obtained monitoring data, estimates in real time the master cylinder pressure such that the controller 22 can stop the pumps 34 from drawing brake fluid if the estimated master cylinder pressure exceeds a predetermined threshold.

Alternatively, since the motor 35 for driving the pumps of the circulation type pressure control unit 30 is characterized in that its driving current or voltage varies corresponding to its load (i.e. discharge pressure), it is also possible to estimate the master cylinder pressure based on the driving current or voltage supplied to the motor 35, and thus to stop the pumps 34 from drawing brake fluid if the thus estimated master cylinder pressure exceeds the threshold. (This alternative arrangement is identical both in structure and control flow to the arrangement of FIG. 17.)

When the controller stops the pumps from drawing brake fluid and as a result, the master cylinder pressure as detected by the sensor or the estimated master cylinder pressure drops below the threshold, if the electronic control unit 5 is determining whether or not it is necessary to adjust pressures in the wheel cylinders, the controller 22 reactivates the pumps 34 so that the pumps 34 draw fluid.

In the arrangement in which the controller 22 is configured to stop the pumps 34 from drawing brake fluid, since pump back flow itself disappears when the pumps 34 stop drawing brake fluid, it is possible to prevent deterioration in durability of fluid seals and destruction of the master cylinder or hydraulic booster even without the above-described hydraulic line 12 and the check valve 13. Since most hydraulic brake systems having the electronic stability control (ESC) function include a pressure sensor for detecting the master cylinder pressure, by providing such a brake control system with the above-described controller 22, it is possible to prevent abnormal rise in master cylinder pressure due to pump back flow, irrespective of whether or not the brake system is further provided with the above-described check valve 13, without a substantial change in structure which can result in increased size and cost of the entire brake system.

DESCRIPTION OF THE NUMERALS

1. Brake operating member
2. Master cylinder
2a. Master piston
2b. Pressure chamber
2c. Return spring
3. Hydraulic booster
3a. Housing
3b. Boost chamber
3c. Boost piston
4. Wheel cylinder
5. Electronic control unit
6. Atmospheric pressure reservoir 7. Auxiliary hydraulic pressure source
7a. Pump
7b. Motor
7c. Pressure accumulator
7d. Pressure sensor
8. Pressure regulator
8a. Spool valve
8b. Return spring
8c. Inlet passage
8d. Discharge passage
9. Fluid chamber
10. Power transmission member
11. Rubber disk
12. Hydraulic line
13. Check valve
13a. Valve body
13b. Spring
13c. Valve seat
13d. Cup seal
13e. Annular seal groove
13f. Annular seal member
13g. Annular groove
13h. O-ring
14. Intermediate chamber
15. Hydraulic line
16. Gap
16i. Opening of the gap leading to the boost chamber
16o. Opening of the gap leading to the auxiliary hydraulic pressure source
17. Guide sleeve
18. Sticking preventive mechanism
18a. Push pin
18b. Stopper
18c. Valve seal
18d. Piston
18e. Spring
Vc. Valve chamber
c1-c3. Fluid chamber
19. Casing
19a. Cylinder
20. Input piston
21. Pressure sensor
22. Controller
30. Circulation type pressure control unit
31. Pressure reducing solenoid valve
32. Pressure increasing solenoid valve
33. Low-pressure fluid reservoir
34. Pump
35. Motor

What is claimed is:

1. A hydraulic booster for use in a hydraulic brake system, comprising an auxiliary hydraulic pressure source including a power pump and a pressure accumulator, a pressure regulator including a spool valve and configured to adjust hydraulic pressure supplied from the auxiliary hydraulic pressure source to a value corresponding to an operating amount of a brake operating member by displacement of the spool valve and to introduce the thus adjusted hydraulic pressure into a boost chamber, and a boost piston for producing an assisting force under the hydraulic pressure introduced into the boost chamber, thereby actuating a master piston of a master cylinder with the assisting force,
wherein the hydraulic booster further comprises at least one hydraulic line which bypasses the pressure regulator and through which one of the boost chamber and a pressure chamber of the master cylinder is connected to one of the auxiliary hydraulic pressure source and an atmospheric pressure reservoir, and at least one check valve provided in the hydraulic line and configured to allow only a discharge of hydraulic pressure from said one of the boost chamber and the pressure chamber of the master cylinder to said one of the auxiliary hydraulic pressure source and the atmospheric pressure reservoir.

2. The hydraulic booster of claim 1, wherein the hydraulic booster further comprises a sticking preventive mechanism configured to move a valve body of the check valve to an open position while brakes are not being applied by a driver, and to return the valve body to a closed position when the brakes are applied by the driver, thereby preventing the check valve from getting stuck.

3. The hydraulic booster of claim 2, wherein the sticking preventive mechanism is configured to move the valve body between the open and closed positions, utilizing one of displacement of the boost piston; displacement of an input piston through which a brake operating force is transmitted to the boost piston; displacement of a piston configured to be displaced under hydraulic pressure that acts on one side of the piston when the brakes are applied; and an electromagnetic actuator driven by a signal generated when the brake operation has started or the brakes have been released.

4. The hydraulic booster of claim 1, wherein said at least one hydraulic line comprises a plurality of hydraulic lines arranged parallel to each other, and wherein said at least one check valve comprises a plurality of check valves provided in the respective hydraulic lines.

5. A hydraulic brake system comprising the hydraulic booster of claim 1, a brake operating member configured to apply a brake operating force to the hydraulic booster, a master cylinder including a master piston configured to be actuated while receiving an assisting force from the hydraulic booster, thus producing a hydraulic pressure in the master cylinder, wheel cylinders configured to produce a braking force under the hydraulic pressure supplied from the master cylinder,
a circulation type pressure control unit including pressure reducing solenoid valves for releasing hydraulic pressure in the respective wheel cylinders, pressure increasing solenoid valves for introducing hydraulic pressure into the respective wheel cylinders, and a circulating pump for drawing brake fluid discharged from the wheel cylinders through the pressure reducing solenoid valves and returning the thus drawn brake fluid into a hydraulic line extending from the master cylinder to the wheel cylinders, and
an electronic control unit which determines whether it is necessary to reduce pressure or reincrease pressure in the respective wheel cylinders and controls the corresponding pressure reducing and pressure increasing solenoid valves based on the determination.

6. The hydraulic brake system of claim 5, further comprising a controller configured to monitor a master cylinder pressure or a boost pressure as detected by a pressure sensor or an estimated master cylinder pressure estimated from electric power supplied to the solenoid valves of the circulation type pressure control unit or from electric power supplied to a motor for driving the pump of the circulation type pressure control unit, and to stop the pump from drawing brake fluid if the master cylinder pressure or the boost pressure as detected by a pressure sensor or the estimated master cylinder pressure exceeds a predetermined threshold.

7. The hydraulic brake system of claim 5, wherein the at least one hydraulic line, which contains the check valve, is provided between one of the boost chamber and the pressure chamber of the master cylinder and the auxiliary hydraulic pressure source, and wherein the hydraulic booster is one of the following first to sixth hydraulic boosters:
- first a hydraulic booster wherein a portion of the hydraulic line and the check valve are provided in the boost piston;
- second a hydraulic booster wherein the check valve includes a spherical valve body;
- third a hydraulic booster wherein the check valve includes a valve body having at least a portion thereof made of a rubber or a resin and configured to be brought into and out of abutment with a flat valve seat, thereby selectively opening and closing the hydraulic line;
- fourth a hydraulic booster including a housing in which the boost piston is mounted, wherein the hydraulic line comprises a gap defined in the housing and connecting the boost chamber to the auxiliary hydraulic pressure source, and wherein the check valve comprises an annular cup-shaped seal sealing an axially intermediate portion of the gap and having an opening facing a portion of the gap leading to the auxiliary hydraulic pressure source;
- fifth a hydraulic booster including a housing in which the boost piston is mounted, wherein the hydraulic line comprises a gap defined in the housing and connecting the boost chamber to the auxiliary hydraulic pressure source, wherein the check valve comprises an annular seal member received in an annular groove formed in an axially intermediate portion of the gap so as to be movable in the annular groove in an axial direction of the boost piston, the annular seal member having two opposed sides configured to receive hydraulic pressures of the auxiliary hydraulic pressure source and the boost chamber, respectively, wherein the annular seal member is configured to be kept in a position where the seal member closes an opening of the annular groove facing a portion of the gap leading to the boost chamber except when the hydraulic pressure of the boost chamber is higher than the hydraulic pressure of the auxiliary hydraulic pressure source by a predetermined value, and configured to open the opening of the annular groove facing the portion of the gap leading to the boost chamber such that the boost chamber communicates with the auxiliary hydraulic pressure source through the gap, only when the hydraulic pressure of the boost chamber is higher than the hydraulic pressure of the auxiliary hydraulic pressure source by the predetermined value; and
- sixth hydraulic booster which includes all the elements of fifth hydraulic booster, wherein the annular seal member is received in the annular groove so as to be reciprocable in the axial direction of the boost piston, and wherein the hydraulic booster further comprises an O-ring positioned in the annular groove and configured to be pressed against a radially outer surface or a radially inner surface of the annular seal member, thereby sealing between the annular seal member and a bottom surface of the annular groove, when the annular seal member is in the position where the seal member closes the opening of the annular groove facing the portion of the gap leading to the boost chamber.

8. The hydraulic brake system of claim 5, wherein the at least one hydraulic line, which contains the check valve, is provided between one of the boost chamber and the pressure chamber of the master cylinder and the atmospheric pressure reservoir, and wherein the hydraulic booster is one of the following first to third hydraulic boosters:
- first a hydraulic booster wherein a portion of the hydraulic line and the check valve are provided in the boost piston;
- second a hydraulic booster wherein the check valve includes a spherical valve body; and
- third a hydraulic booster wherein the check valve includes a valve body having at least a portion thereof made of a rubber or a resin and configured to be brought into and out of abutment with a flat valve seat, thereby selectively opening and closing the hydraulic line.

* * * * *